United States Patent
Phillips et al.

(10) Patent No.: US 8,009,988 B2
(45) Date of Patent: Aug. 30, 2011

(54) RAMAN CANCELLATION AND MANAGEMENT IN CATV TRANSPORT AND DISTRIBUTION VIA RF SPECTRUM INVERSION

(76) Inventors: Mary R. Phillips, Chicago, IL (US); Kuang-yi Wu, Bolingbrook, IL (US); Fernando Xavier Villarruel, Romeoville, IL (US)

( * ) Notice: Subject to any disclaimer, the term of this patent is extended or adjusted under 35 U.S.C. 154(b) by 707 days.

(21) Appl. No.: 11/942,768

(22) Filed: Nov. 20, 2007

(65) Prior Publication Data
US 2009/0129778 A1  May 21, 2009

(51) Int. Cl.
 *H04B 10/00* (2006.01)
 *H04B 10/04* (2006.01)
 *H04B 10/12* (2006.01)

(52) U.S. Cl. ........ 398/115; 398/147; 398/158; 398/186; 398/193; 398/194

(58) Field of Classification Search .......... 398/115, 398/140, 147, 158, 186, 192–194
See application file for complete search history.

(56) References Cited

U.S. PATENT DOCUMENTS

| | | | | |
|---|---|---|---|---|
| 5,257,124 A | * | 10/1993 | Glaab et al. | 398/91 |
| 5,436,749 A | * | 7/1995 | Pidgeon et al. | 398/193 |
| 7,085,499 B2 | * | 8/2006 | Yap et al. | 398/183 |
| 2002/0176132 A1 | * | 11/2002 | Sarraf | 359/124 |
| 2006/0001487 A1 | * | 1/2006 | Petrovic et al. | 330/149 |
| 2006/0115273 A1 | | 6/2006 | Kikushima | |
| 2006/0165413 A1 | * | 7/2006 | Schemmann et al. | 398/71 |

FOREIGN PATENT DOCUMENTS

| | | |
|---|---|---|
| EP | 0 528 225 A | 2/1993 |
| JP | 58 215836 A | 12/1983 |
| WO | WO 99/17474 A | 4/1999 |

OTHER PUBLICATIONS

Wong et al.; 35-dB Nonlinear Crosswalk Suppression in a WDM Analog Fiber System by Complementary Modulation of Twin Carriers; IEEE Photonics Technology Letters, vol. 14, No. 5, pp. 699-701; May 2002.

* cited by examiner

*Primary Examiner* — Dalzid Singh
(74) *Attorney, Agent, or Firm* — Tarolli, Sundheim, Covell & Tummino LLP

(57) ABSTRACT

Provided herein are at least one embodiment of a system and method for reducing or eliminating crosstalk and associated distortion in a wavelength-division multiplexed optical signal transmitted over a fiber optic network by inversion of the RF signals that are inputs to the system.

20 Claims, 8 Drawing Sheets

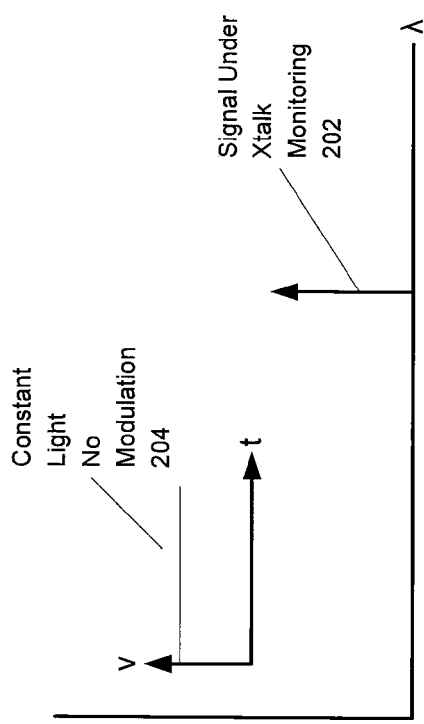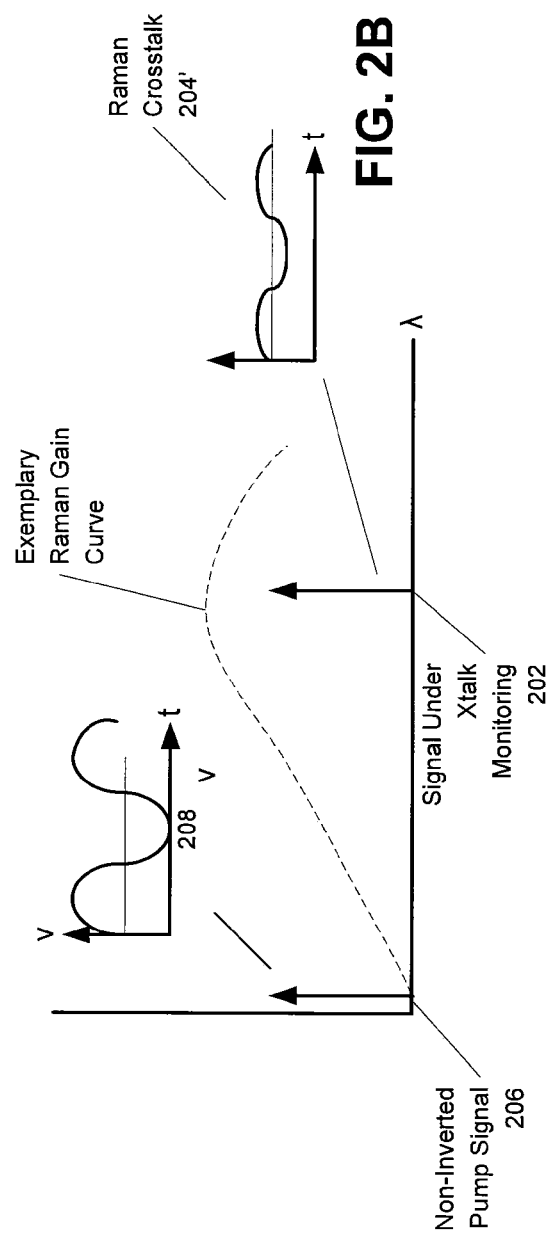

RAMAN CANCELLATION AND MANAGEMENT IN CATV TRANSPORT AND DISTRIBUTION VIA RF SPECTRUM INVERSION

TECHNICAL FIELD

The present disclosure relates generally to optical signal transmission and more specifically to transmission and distribution of optical signals at a plurality of wavelengths in a video distribution system.

BACKGROUND

In the mid 1990's it became obvious that the world-wide consumer appetite for bandwidth hungry applications would eventually mean a shift not only in the consumer electronics that deliver the "experience," but also in the way that access networks would be deployed and used. At the time, while advances in data delivery over legacy copper networks (DSL for instance) and the implementation of hybrid-coaxial deployments seemed to suffice it was clear that in a short time both of these methods would have severe shortcomings to available end line customer applications. By the early years in this decade, the accelerated availability of high definition television programming, video-on-demand, VoIP, peer to peer gaming, IM, video uploading, etc, made the need for improved access immediate. Computer networks have evolved to the extent where they are coupled to subscriber television systems for the delivery of multi-media entertainment, including audio and video. Likewise, subscriber television systems offer broadcast signals carrying information broadcast to a wide audience (e.g., content from CBS, NBC, ABC, HBO, etc.) and narrowcast signals carrying context or destination-specific information (e.g., video-on-demand, web-data, etc.). In other words, narrowcast signals are directed more specifically or selectively to individuals or groups of subscribers. Further exacerbating the demand for fiber and narrowcast bandwidth is the demand for localized and customized programming that is specific to a subset of users, or even single users.

Optical and hybrid networks were developed to satisfy the growing appetite for bandwidth and speed. For instance, in subscriber television systems, among other networks, hybrid fiber/coaxial (HFC) network infrastructures have been developed to create a broadband network to handle a wide range of information. In a subscriber television system utilizing HFC, a forward path (e.g., from a headend to subscribers) carries information through a network of optical and cable mediums and corresponding components and equipment. A return path is also typically established, whereby data from each subscriber terminal (e.g., set-top box) can be carried back to the headend. However, the demand for bandwidth and speed has eclipsed the rate at which fiber plant can be installed. In order to overcome this challenge, multiplexing systems were developed that allowed multiple optical signals to be carried simultaneously over a single fiber, thus reducing the demand for additional fiber strands. Multiplexed signals are generally demultiplexed at a node.

Typically, a node is included in the forward path to act as a point of distribution for signals received from the headend, and as a point of consolidation for a plurality of subscriber terminals sending signals back to the headend. Nodes may be "partitioned" logically to segment the node into a plurality of subgroups, each subgroup responsible for feeding information to and receiving information from a plurality of subscriber terminals. For instance, narrowcast signals, given the selectivity in intended destinations, are often demultiplexed at the node, and channeled to the logical segment to be forwarded to the intended destination.

Several techniques have been employed in the past to provide narrowcast and broadcast signals over an optical network. One method involves the use of a broadcast transmitter residing at the headend to deliver broadcast signals and a plurality of narrowcast transmitters multiplexed at the headend to deliver narrowcast signals. The broadcast transmitter can be an externally modulated or directly modulated optical transmitter located at or near the dispersion zero wavelength of the optical fiber. The narrowcast transmitters generally comprise high launch powers (e.g., >8 dBm) and utilize a dense wavelength division multiplexed (DWDM) ITU spectrum in the "C" band to reduce nonlinear crosstalk due to high launch powers. The broadcast and narrowcast signals are carried along the optical medium and received at a receiver residing at the node, the receiver combining the broadcast and narrowcast signals. The receiver generally comprises a photodiode that receives and converts the optical signal to an electrical signal for further processing.

Some limitations to such a conventional approach include the use of the DWDM spectrum in which the launch powers are high, which may increase the risk of non-linear cross-talk at large wavelength differences. Furthermore, crosstalk and distortion can also preclude the use of coarse wavelength division multiplexing (CWDM).

Therefore, what is needed are systems and methods that overcome challenges found in the art, many of which are described above

OVERVIEW

Provided herein are embodiments of a system and method for reducing or eliminating crosstalk in a multiplexed fiber optic network by inversion of broadcast RF signals that are inputs to the system.

In one aspect, a method of reducing crosstalk in multiplexed optical signals is provided. The method comprises the steps of receiving a plurality of radio frequency (RF) signals. The plurality of RF signals are converted into a plurality of intensity-modulated optical signals, wherein each of the plurality of intensity-modulated optical signals has a different wavelength. Pairs of intensity-modulated optical signals are formed by selecting for each pair a first intensity modulated signal that is inverted to a second intensity modulated optical signal, wherein the intensity modulated optical signals that comprise the pairs are chosen from the plurality of intensity modulated optical signals and are relatively close in wavelength, but not the same wavelength. In one aspect, each of the pairs of intensity-modulated optical signals has a polarization state that is substantially the same, though this is not strictly required as improvements still can be seen even without aligned polarization states. The pairs of intensity-modulated optical signals are multiplexed into a multiplexed optical signal and the multiplexed optical signal is transmitted through a fiber optic network, wherein the inverted pairs of intensity modulated optical signals reduce Raman and other crosstalk (and associated distortion) imposed on any other optical signal that comprises the multiplexed optical signal by any one of the intensity modulated optical signals that form the pairs. The plurality of RF signals can be comprised of a combination of broadcast and narrowcast video signals. In various aspects, the pairs of intensity-modulated optical signals can be multiplexed using coarse wavelength-division multiplexing (CWDM) or dense wavelength-division multiplexing (DWDM).

In another aspect, a system for transporting voice, data and video signals over a fiber optic network with reduced Raman and other crosstalk is described. The system is comprised of one or more inverter devices that receive at least one of a plurality of radio frequency (RF) signals. The system is further comprised of one or more transmitters that convert the plurality of RF signals into a plurality of intensity-modulated optical signals, wherein each of said plurality of intensity-modulated optical signals has a different wavelength. The system also includes a multiplexer that receives the plurality of intensity-modulated optical signals and multiplexes them into a multiplexed optical signal comprised of pairs of intensity-modulated optical signals having a first intensity modulated signal that is inverted to a second intensity modulated optical signal. In one aspect, each of said pairs of intensity-modulated optical signals has a polarization that is substantially the same, though improvement is seen even without alignment of the input polarization states. The intensity modulated optical signals that comprise the pairs are chosen from the plurality of intensity modulated optical signals and are relatively close in wavelength but not the same. The inverted pairs of intensity modulated optical signals reduce Raman and other crosstalk imposed on any other optical signal that comprises the multiplexed optical signal by any one of the intensity modulated optical signals that form the pairs. In one aspect, the system further comprises a demultiplexer, wherein the demultiplexer receives the multiplexed optical signal through a fiber optic network and demultiplexes the multiplexed optical signal into one or more optical signals, and a receiver, wherein the receiver receives at least one of the one or more optical signals and converts the optical signal into a received electronic signal.

Another aspect according to the present invention is a transmitter for reducing Raman and other crosstalk in a system for transporting voice, data and video signals over a fiber optic network. The transmitter is comprised of an amplifier that receives an input radio frequency (RF) signal and provides an output RF signal. The amplifier is configured to provide either an output RF signal that is inverted to the input RF signal or an output RF signal that is not inverted to the input RF signal. The transmitter is further comprised of one or more electro-optical converters, wherein the one or more electro-optical converters receive the output RF signal and converts the output RF signal into an optical signal. Further comprising the transmitter is one or more modulators, wherein each modulator modulates the intensity of the optical signal. In one aspect, the transmitter can be further comprised of an RF or optical delay mechanism such that either the RF input or the optical signal can be adjustably delayed with respect to the input RF signal.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems:

FIGS. 2A-2C illustrate the effects of Raman crosstalk on a monitored signal and the properties in accordance with the present invention that results in the cancellation of at least a portion of the Raman crosstalk;

DESCRIPTION OF EXAMPLE EMBODIMENTS

Figure 1:
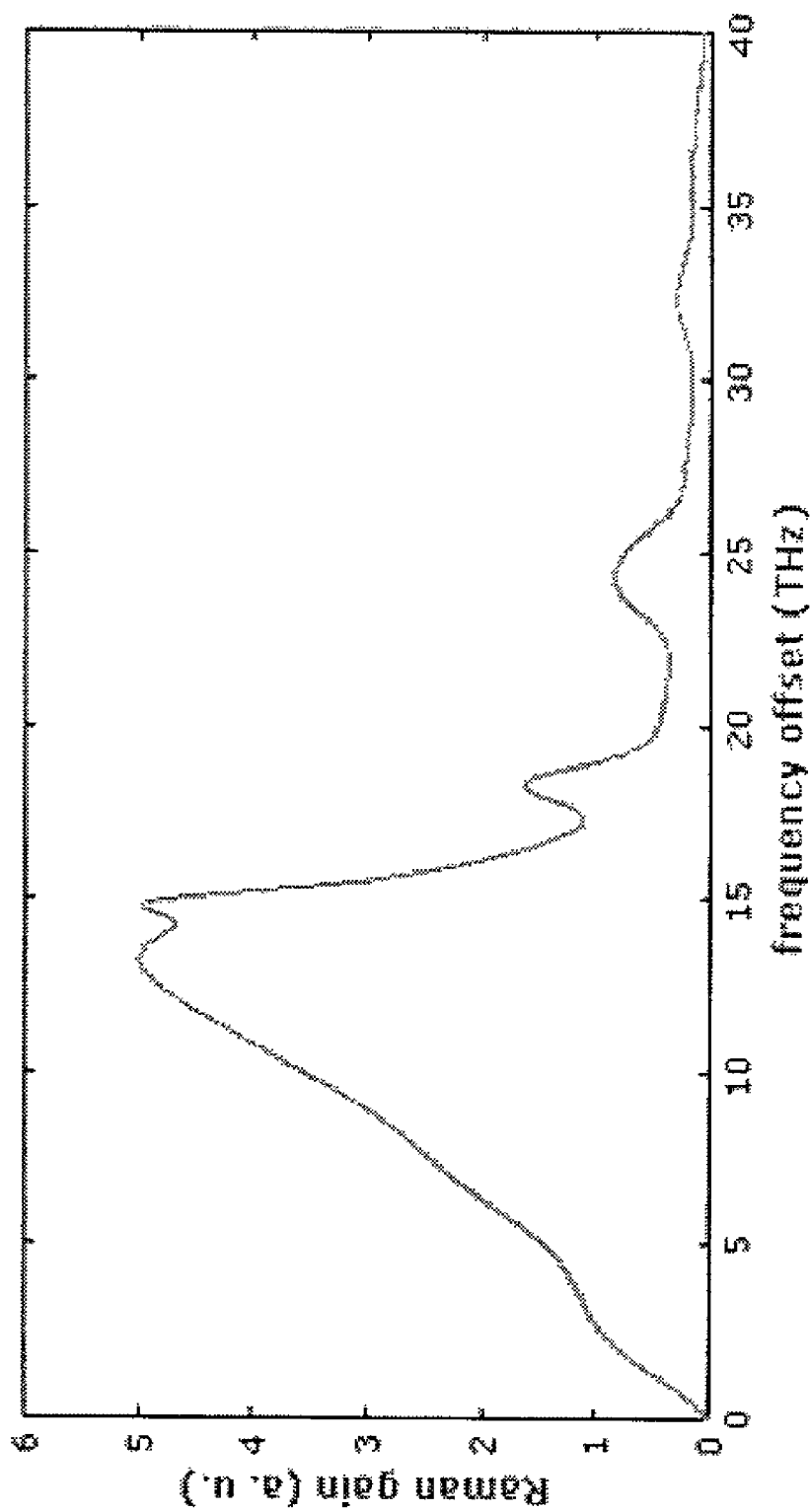
FIG. 1 is an example of a typically measured Raman gain curve.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of preferred embodiments and the Examples included therein and to the Figures and their previous and following description.

I. HFC

HFC is a telecommunications industry term for a network which incorporates both optical fiber along with coaxial cable to create a broadband network. The fiber optic network extends from the cable operators' master headend or telco central office, sometimes to regional headends, and out to a neighborhood's hub site, and finally to a fiber optic node which serves anywhere from 25 to 2000 homes. A master headend or central office will usually have satellite dishes for reception of distant video signals as well as IP aggregation routers. Some master headends also house telephony equipment for providing telecommunications services to the community. A regional or area headend will receive the video signal from the master headend and add to it the Public, Educational and/or Governmental (PEG) channels as required by local franchising authorities or insert targeted advertising that would appeal to a local area.

II. Fiber Networks

Optical distribution networks have several competing technologies. The simplest optical distribution network can be called direct fiber. In this architecture, each fiber leaving the central office goes to exactly one customer. More commonly each fiber leaving the central office is actually shared by many customers. It is not until such a fiber gets relatively close to the customers that it is split into individual customer-specific fibers. There are two competing optical distribution network architectures which achieve this split: active optical networks (AONs) and passive optical networks (PONs).

Active optical networks rely on electrically powered equipment to distribute the signal, such as a switch, router, or multiplexer. Each signal leaving the central office is directed only to the customer for which it is intended. Incoming signals from the customers avoid colliding at the intersection because the powered equipment there provides buffering.

Passive optical networks do not use electrically powered components to split the signal. Instead, the signal is distributed using beam splitters. Each splitter typically splits a single fiber into 16, 32, or 64 fibers, depending on the manufacturer, and several splitters can be aggregated in a single cabinet. A beam splitter cannot provide any switching or buffering capabilities; the resulting connection is called a point-to-multipoint link. For such a connection, the optical network terminations on the customer's end must perform some special functions which would not otherwise be required. For example, due to the absence of switching capabilities, each signal leaving the central office must be broadcast to all users served by that splitter (including to those for whom the signal is not intended). It is therefore up to the optical network termination to filter out any signals intended for other customers.

In addition, since beam splitters cannot perform buffering, each individual optical network termination must be coordinated in a multiplexing scheme to prevent signals leaving the customer from colliding at the intersection. Two types of multiplexing are possible for achieving this: wavelength-division multiplexing (WDM) and time-division multiplexing. With wavelength-division multiplexing, each customer transmits their signal using a unique wavelength. With time-division multiplexing, the customers "take turns" transmitting information.

The dramatically increasing service demand driven by the rapid growth of the Internet and other information and data-driven technologies generates new challenges for WDM system designers. Common design approaches reach their limits, and the usage of comprehensive modeling techniques becomes more and more important. Additionally, to achieve the demanding targets created by the application-oriented business developments, future systems must comply with upgraded performance criteria, such as transmission of higher total data capacities through increased channel bit rates and number of wavelength-multiplexed channels and reduction of signal distortion to allow transmission over longer all-optical transmission links Some design approaches to meet these criteria include new transmission windows in wavelength domain, new types of optical amplifiers covering a very high signal bandwidth to increase data capacity, and bidirectional WDM transmission allowing suppression of nonlinear fiber interactions. All of these techniques require a thorough understanding of the underlying physical effects and the interplay between diverse optical devices to judge their impact on system performance measures, using numerical simulation tools.

III. Raman Amplification and Raman Crosstalk

Raman amplification, as known to one of ordinary skill in the art, involves the usage of intrinsic properties of silica fibers to obtain signal amplification. This means that transmission fibers can be used as a medium for amplification, and hence that the intrinsic attenuation of data signals transmitted over the fiber can be combated within the fiber. An amplifier working on the basis of this principle is commonly known as a distributed Raman amplifier (DRA).

The physical property behind Raman amplification is stimulated Raman scattering (SRS). This occurs when a sufficiently large pump wave is co-launched at a lower wavelength than the signal to be amplified. The Raman gain depends strongly on the pump power and the frequency offset between pump and signal. Amplification occurs when the pump photon gives up its energy to create a new photon at the signal wavelength, plus some residual energy, which is absorbed as phonons (vibrational energy). However, it is to be appreciated that Raman amplification can occur in multiplexed optical signals inadvertently, as any one of a group of multiplexed signals can act as a pump for the other multiplexed signals, thus resulting in amplification (and crosstalk) of the amplified signals and loss (and crosstalk) of the pump signals. As there is a wide range of vibrational states above the ground state, a broad range of possible transitions are providing gain. Generally, Raman gain increases almost linearly with frequency offset between signal and pump (as separation of wavelength channels widens). The gain peak occurs at the wavelength separation around 100 nm (12 THz) at 1550 nm window, and 70 nm at 1310 nm window. Raman gain drops off rapidly with increase offset greater than 15 THz. FIG. 1, which applies in any wavelength band, shows an example of a typically measured Raman gain curve for silica fiber. As there may be other signals operating in the gain region of the pump signal, Raman crosstalk can be induced on those signals by modulation of the pump signal.

With (desired) Raman amplification, the position of the gain bandwidth within the wavelength domain can be adjusted simply by tuning the pump wavelength. However, in multiplexed optical signals it may not be possible to adjust the wavelengths. Thus, Raman amplification potentially can be seen in every region of the transmission window of the optical transmission fiber, even if undesired, and result in Raman crosstalk on the multiplexed optical signals.

Other nonlinear effects in the fiber material can lead to crosstalk and distortion in a WDM system. These include cross-phase modulation in which the optical phase of one signal is modified by the power of another signal through the nonlinear refractive index. Subsequent chromatic dispersion or polarization-dependent transmission can convert this phase modulation to power modulation, thereby leading to crosstalk and distortion. Four-wave mixing is another nonlinear optical process that can lead to crosstalk and distortion in a WDM system. The method described here works to reduce the crosstalk and associated distortion from any of these nonlinear sources.

IV. Reducing Raman and Other Crosstalk

Figure 2C:
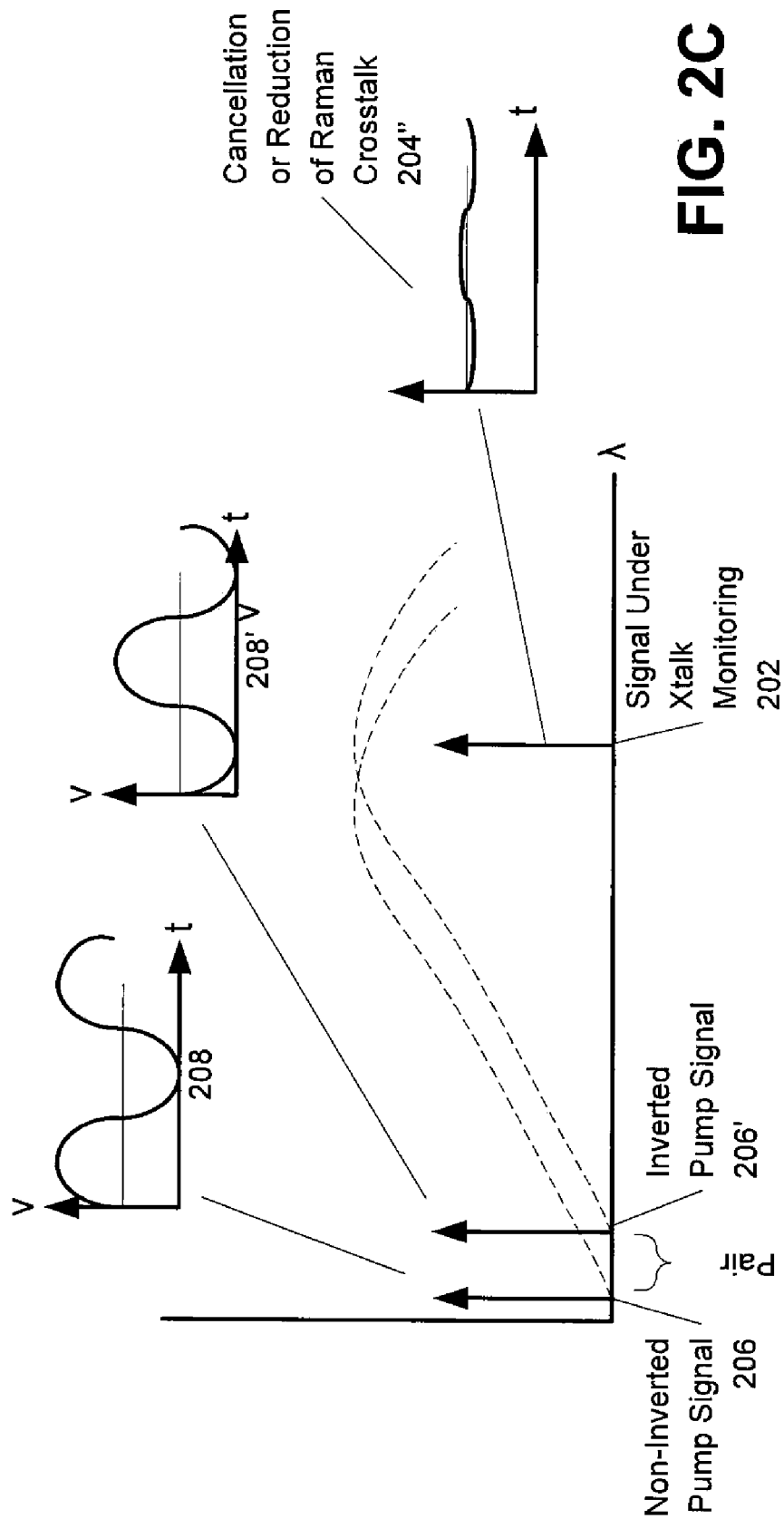

FIGS. 2A-2C illustrate the effects of Raman crosstalk on a monitored signal and the properties in accordance with the present invention that results in the cancellation of at least a portion of the Raman crosstalk.

In FIG. 2A, a wavelength being monitored 202 is transmitting light at a constant power (i.e., no modulation), which results in an output signal 204 with practically no Raman crosstalk.

In FIG. 2B, the wavelength being monitored 202 is being affected by a second non-inverted pump signal 206 that is modulated, as shown by its output signal 208. This second signal 206 is acting as a pump to provide Raman amplification (and hence Raman crosstalk) to the first signal 202, as shown by the output signal 204'.

FIG. 2C is a graphical illustration of the principles that underlie embodiments of the present invention and allow at least partial cancellation of Raman crosstalk. The wavelength being monitored 202 is being affected by a first, non-inverted modulated signal 206. A second, inverted, modulated wavelength signal 206' is also affecting the monitored signal 202. Second inverted wavelength signal 206' is inverted to the first, non-inverted wavelength signal 206 as shown by the respective output signals 208' and 208. Either of signals 206 and 206' acting alone have the potential to impose Raman crosstalk onto the monitored signal 202. However, because the two signal 206, 206' are inverted to one another, they effectively cancel or reduce the Raman crosstalk imposed on the monitored signal 202, as shown by the output signal 204". An exemplary system for implementation of the results shown in FIG. 2C is shown in FIG. 3C, below.

Figure 3A:
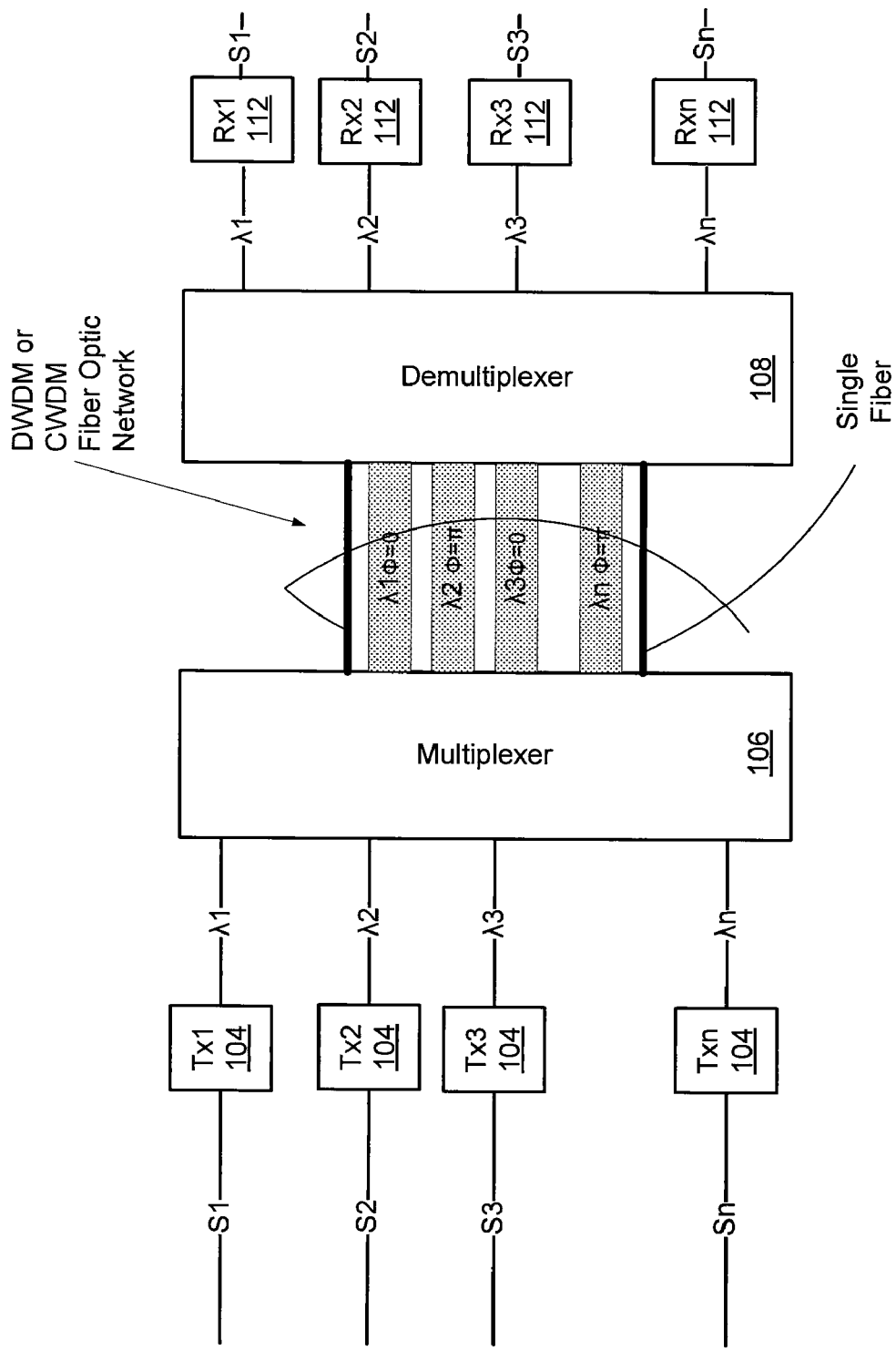
FIGS. 3A-3C are illustrations of systems for transporting video, voice and data over a fiber optic network in embodiments according to the present invention.
Figure 3B:
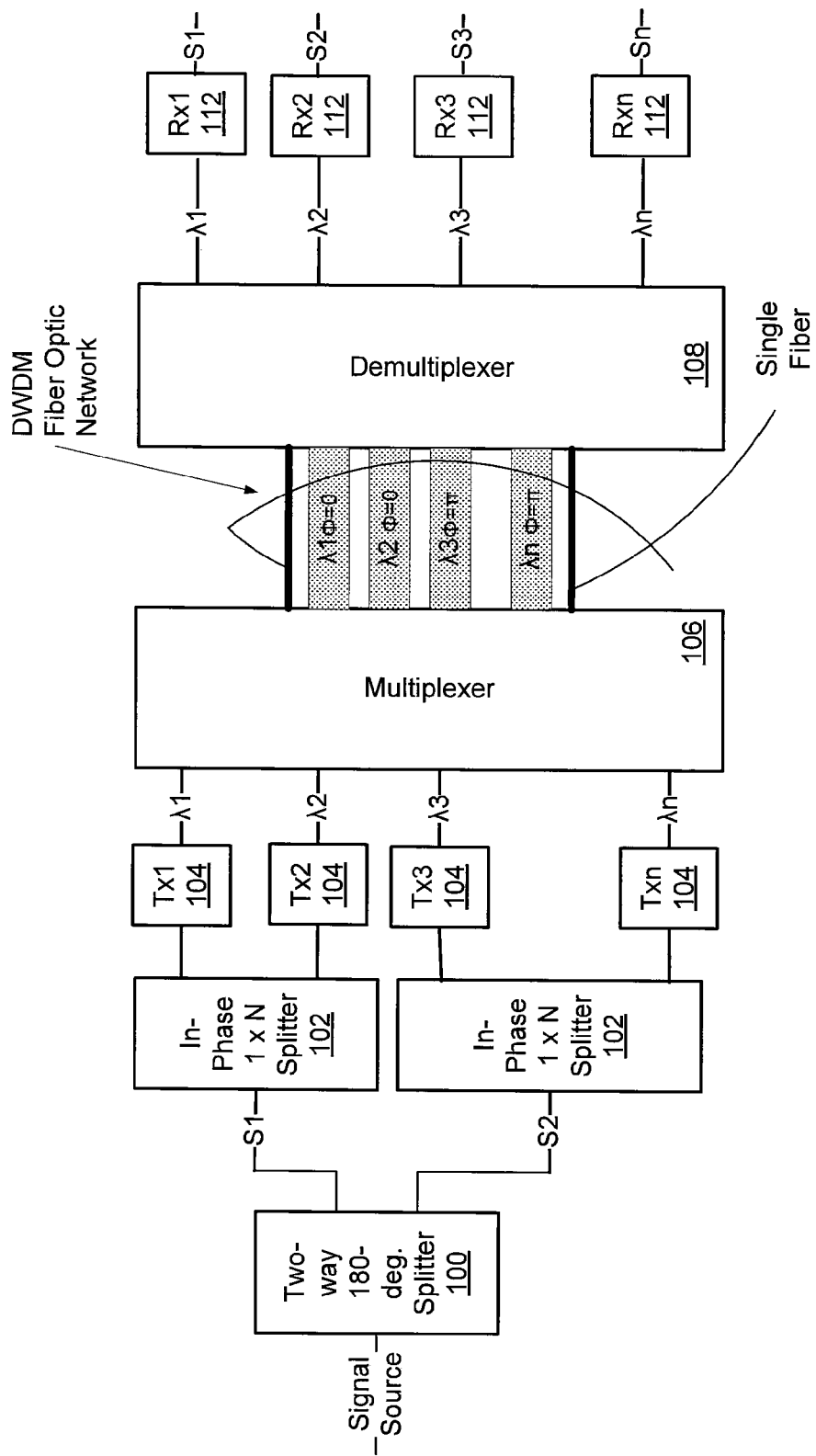
Figure 3C:
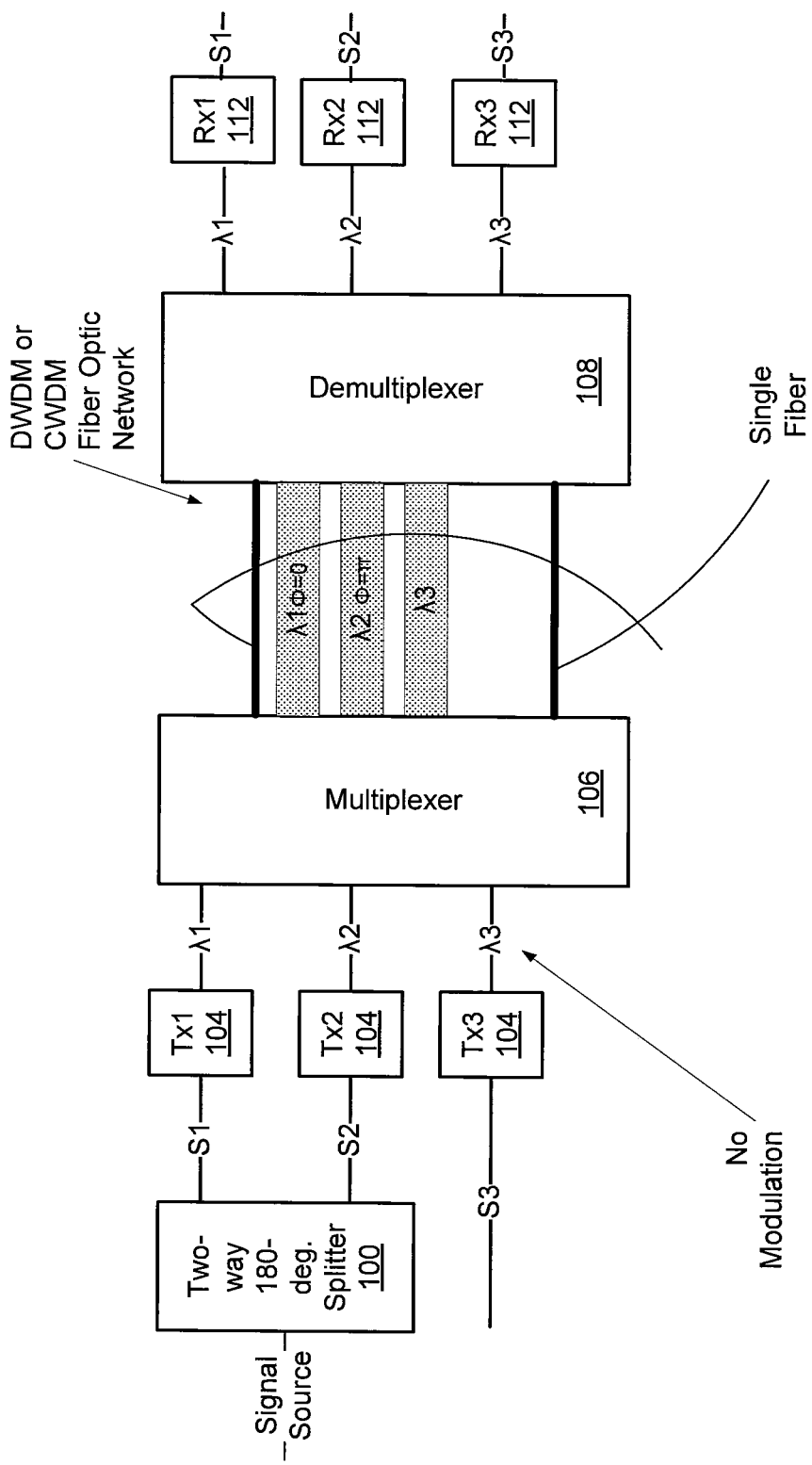

FIGS. 3A-3C are illustrations of systems for transporting video, voice and data over a fiber optic network in embodiments according to the present invention. In FIG. 2A, the system is comprised of one or more transmitters 104 configured to receive radio frequency (RF) signals (S1-Sn) and convert them to optical signals, as are known to one of ordinary skill in the art. In one aspect, the RF signals are each inverted to one another, meaning that they are substantially 180-degrees (electrically) out of phase, though other phase relationships are contemplated within the scope of this invention. Moreover, for each optical signal that is modulated by the transmitter 104, there is another optical signal of a nearby wavelength and similar or same amplitude that is substantially inverted to the first optical signal. Therefore, the number of RF signals (S1-Sn) received by the transmitters 104 is typically divisible by two. Modulation can occur by a directly-modulated transmitter or by use of an external modulator associated with a transmitter 104. While FIG. 3A illustrates adjacent optical signals being inverted to one another, it is to be appreciated that in some instances the order may be different. For instance, the first two (or more) optical signals may be at the same phase, while the remaining corresponding optical signals are inverted to the first two (or more) signals.

The signals (S1-Sn) are comprised of voice, data, video, etc. In various aspects, the signals (S1-Sn) can be comprised of broadcast information or combinations of broadcast and narrowcast information. Further, the signals (S1-Sn) can be comprised of combinations of voice, data and video such as broadcast information in combination with a QAM signal. For instance, the input signals (S1-Sn) to the system can be comprised of n narrowcast signals and one broadcast signal that is connected with each of the narrowcast signals. Here, cancellation will only work on the broadcast signal. Similarly, each input signal (S1-Sn) can be comprised of a discrete narrowcast signal in combination with a separate broadcast signal. It is to be appreciated that these are just a few input signal arrangements, and that numerous others are contemplated under the scope of the invention.

The input signals (S1-Sn) can be inverted to one another. This can be accomplished by, for example, the use of a device that acts as an inverter, as shown in FIGS. 3B and 3C. The RF input signals (S1-Sn) are converted to optical signals ($\lambda1$-$\lambda n$) by the transmitters (Tx1-Txn) 104. In one aspect, the transmitters 104 can be, for example, O-band broadband transmitters as available from Scientific-Atlanta, Inc., a Cisco Company, of Lawrenceville, Ga., though other transmitters are contemplated within the scope of this invention.

Further comprising the system for transporting video, voice and data over a fiber optic network of FIG. 3A is a multiplexer 106, where the optical signals ($\lambda1$-$\lambda n$) are multiplexed into a combined optical signal and transmitted over a fiber network. The multiplexer 106 is an optical multiplexer, as are known in the art, and has a plurality of inputs and at least one output. The outputs of each of the one or more optical transmitters 104 are operatively connected with a respective one of the plurality of inputs of the multiplexer 106. The output of the multiplexer 106 is configured to transmit a combined optical signal comprised of the transmitter output optical signals having respective transmitted power levels. The combined optical signal is comprised of optical signals having wavelengths that are inverted ($\Phi1=0$, $\Phi2=\pi$, $\Phi3=0$, etc.) to one another, as shown in FIG. 3A. The combined optical signal has a combined power level. The multiplexer 106 can be a polarization-maintaining multiplexer, as are known in the art, such that the polarization of the input optic signals ($\lambda1$-$\lambda n$) is maintained by the multiplexer 106. Further, multiplexing the plurality of intensity-modulated optical signals into a multiplexed optical signal can comprise coarse wavelength-division multiplexing (CWDM) or dense wavelength-division multiplexing (DWDM), as are known in the art to one of ordinary skill. However, if the multiplexing is CWDM, the input optical signals ($\lambda1$-$\lambda n$) to the multiplexer 106 are paired such that adjacent signals are inverted to one another. If DWDM is utilized, then the order of the input optical signals is generally not as important. Furthermore, if DWDM is used, then the wavelengths of the paired, inverted, optical signals are generally within 2 nanometers (nm) of each other's wavelength. If CWDM is used, then the wavelengths of the paired, inverted optical signals are generally within 20 nm of each other.

As described above, the optical signals at the output of the multiplexer 106 are matched in pairs of relatively close wavelength that are inverted to one another (e.g., an optical signal that comprises the first optical signal of a pair is inverted to the optical signal that comprises the second optical signal of the pair). Because transmitters 104 may have inherent (and varying delays), the phase relationship can be manipulated in order to maintain the inverted relationship between signals by adjusting the length of the fiber that connects the output of the transmitters to the inputs of the multiplexer 106 or by creating an inherent or adjustable delay in the transmitter 104 and/or the multiplexer 106 through electronic circuitry and/or optical component path length. The delay allows the transmitters to be tuned such that the optical signals of a pair can be inverted to one another at the output of the multiplexer 106, thus reducing Raman crosstalk at the receiving end of a fiber optic network. Furthermore, optical signals ($\lambda1$-$\lambda n$) are polarly aligned in the RF-optical conversion process of the transmitters 104 so that they all have the same light polarization (are co-polarized) at the input(s) to multiplexer 106. But even without this restriction, a reduction in Raman crosstalk can be seen.

While the fiber optic network in FIGS. 3A-3C is illustrated as only a fiber optic cable carrying optical signals ($\lambda1$-$\lambda n$) inverted to one another, it is to be appreciated that the network can be comprised of numerous discrete passive and active components such as fiber optic cable, terminations, splitters, amplifiers, WDMs, etc. In one aspect, the fiber optic cable is part of a hybrid-fiber coaxial (HFC) network, which are known in the art and further described herein.

As described above, any one of the optical signals ($\lambda1$-$\lambda n$) can act as a pump for Raman amplification for any one or more of the other optical signals. Even if the optical signals are close together (in regard to wavelength), modulation of a "pump" signal can result in Raman crosstalk in other optical signals that are multiplexed. Crosstalk on the pump through Raman loss can also be induced through modulation of the other optical signals. This is exacerbated in CWDM where the optical signals are spaced further apart in the wavelength spectrum. However, by shifting the phase (i.e., inverting) RF signals (S1-Sn) such that resultant transmitted pairs of optical signals are inverted to one another, Raman crosstalk can be reduced or eliminated between the optical signals in the fiber optic network. This is because the Raman amplification of a pumping signal is offset, at least in part, by its paired signal which is inverted to the pumping signal.

Further comprising the system of FIG. 3A is an optical demultiplexer 108, which is used to separate the various optical signals that comprise the multiplexed optical signal ($\lambda 1$-$\lambda n$). The optical demultiplexer 108 is configured to receive the combined optical signal from the fiber optic network, split the combined optical signal into a plurality of discrete output optical signals of varying power and wavelength selections, and transmit each discrete output optical signal to one or more of the plurality of outputs of the demultiplexer 108. The wavelength selections can be comprised of a signal having a single wavelength, or a signal comprised of a plurality of wavelengths. The signal can be further split using, for example, a 1×N splitter, as are known in the art. The optical signals ($\lambda 1$-$\lambda n$) are then converted back to electronic/RF signals by receivers (Rx1-Rxn) 112. Because of the inverted electronic signals input to the system (S1-Sn), Raman and other crosstalk in the output signals is reduced or eliminated.

FIG. 3B illustrates another embodiment of a system for transporting video, voice and data over a fiber optic network according to the present invention. In FIG. 2B, a device is provided for inverting RF signals to one another. For example, the device can be a two-way 180-degree splitter 100, as shown in FIG. 2B, though other devices, such as an inverting amplifier or an inverter, as are known to one of ordinary skill in the art, are contemplated within the scope of embodiments according to the present invention. In one aspect, for example, the two-way 180-degree splitter 100 can be a coaxial power splitter/combiner such as model ZFSCJ-2-4 as available from Mini-Circuits of Brooklyn, N.Y., though other splitters and inverting devices are also contemplated. In FIG. 3B, a signal source is provided to the two-way 180-degree splitter 100. As provided herein, the signal can be an RF signal comprised of voice, data, video, etc. In various aspects, the signal can be comprised of broadcast information or combinations of broadcast and narrowcast information. Further, the signal can be comprised of combinations of voice, data and video such as broadcast information in combination with a QAM signal.

Once the signal is received by the two-way inverting splitter 100, the signal source is split and the two signals (S1 and S2) are then inverted to one another. The inverted signals (S1 and S2) can then be further split by, for example, a 1×N splitter 102 as shown in FIG. 3B. In one aspect, adjacent signals provided to the inputs of the transmitters 104 can have the same phase relationship, which is generally acceptable where DWDM is utilized, but is generally not preferred for CWDM. However, it is to be appreciated that the inputs to the transmitters can be transposed such that adjacent input signals do not have the same phase relationship, thereby allowing the use of DWDM and CWDM. The system then functions as described in reference to FIG. 3A, above.

FIG. 3C illustrates yet another embodiment of a system for transporting video, voice and data over a fiber optic network according to the present invention. In this embodiment, an unmodulated signal, S3, is provided to the multiplexer. The modulated signals, S1 and S2, are inverted to one another by the two-way 180-degree splitter 100, as previously described herein. Because the resultant optical signals ($\lambda 1$ and $\lambda 2$) are inverted to one another as shown by the phase relationships ($\lambda 1$, $\Phi = 0$ and $\lambda 2$, $\Phi = \pi$), they will not induce, or will only minimally induce, Raman crosstalk on the unmodulated signal, $\lambda 3$, as described in relation to FIGS. 2A-2C. Likewise, the unmodulated signal will not induce Raman crosstalk on the modulated signals, $\lambda 1$ and $\lambda 2$. Though FIG. 3C is only shown with one pair of modulated signals, S1 and S2, it is to be appreciated that it can be extended to any number of pairs of modulated signals that are inverted to one another and to any number of unmodulated signals.

In one aspect of FIGS. 3A-3C, the multiplexer 106 is a polarization-maintaining multiplexer, as are known to one of ordinary skill in the art.

Figure 4:
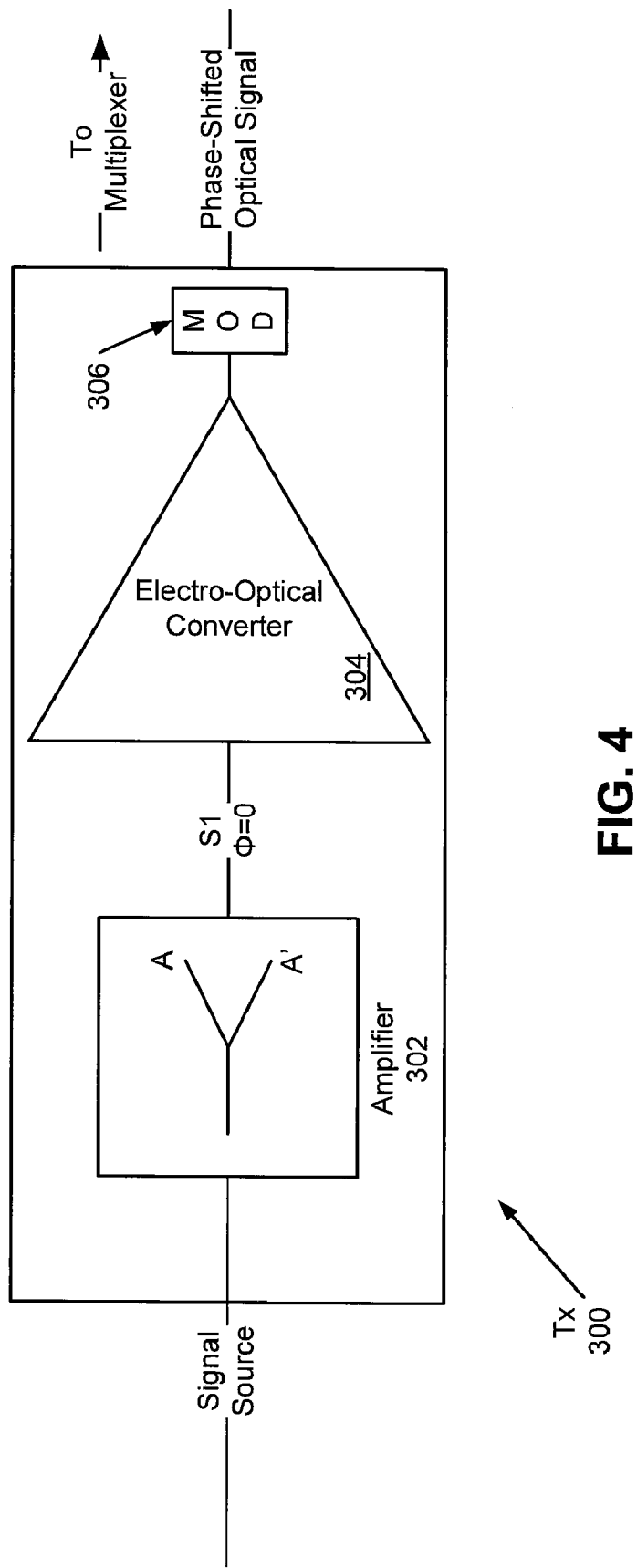
FIG. 4 is an illustration of a transmitter for inverting the phase(s) of RF signals in order to cancel Raman crosstalk in a system for transporting voice, data and video signals over a fiber optic network in an embodiment according to the present invention.

FIG. 4 is an illustration of a device that can act as a transmitter and for inverting the phase(s) of RF signals in order to cancel Raman crosstalk in a system for transporting voice, data and video signals over a fiber optic network in an embodiment according to the present invention. The transmitter 300 of FIG. 4 is comprised of at least one device that can invert signals to one another. In this instance, the device is an amplifier 302 that is configured to provide an output A' that is inverted to its input, or the same A as its input. The output of the amplifier 302, whether inverted to the input signal or having the same phase relationship as the input signal, is provided to an electro-optical converter 304, comprised of at least a laser diode, that convert the signals to optical signals. The optical signals can further be modulated to vary in intensity corresponding to the variation in intensity (i.e., amplitude) of the electrical signals. The modulation can occur by modulators 306 that are integral to the transmitter 300, by direct modulation or by external modulators. The modulated optical signals are then provided to the multiplexer 106, as previously described. Transmitters 300 can be used to form pairs of optical signals that are inverted to one another. In one aspect, the transmitters further comprise optical and/or electronic delays such that output optical signals of a plurality of transmitters can be adjusted to minimize Raman crosstalk at a receiving end of a fiber optic network. In one aspect this can be accomplished by creating an RF interferogram by detecting modulated RF signals from two optical transmitters simultaneously. When the electrical-to-optical delay time are perfectly matched on the transmitters, the phase inversion will cause the receiving RF signals to cancel out on each other. By examining how the broadband RF interferogram does, the amount of time delay between two transmitters can be calculated. For example, if one transmitter has a fiber length approximately 62 cm longer than the other transmitter, a co-sinusoidal RF interferogram on the RF spectrum analyzer can be seen, where the node (strongest cancellation) occurs at around 225 MHz. The transmitter can also include devices and/or circuitry for adjusting the polarity of the output optical signals such that all the optical signals output by a plurality of transmitters are co-polarized.

V. Example Methods

Figure 5:
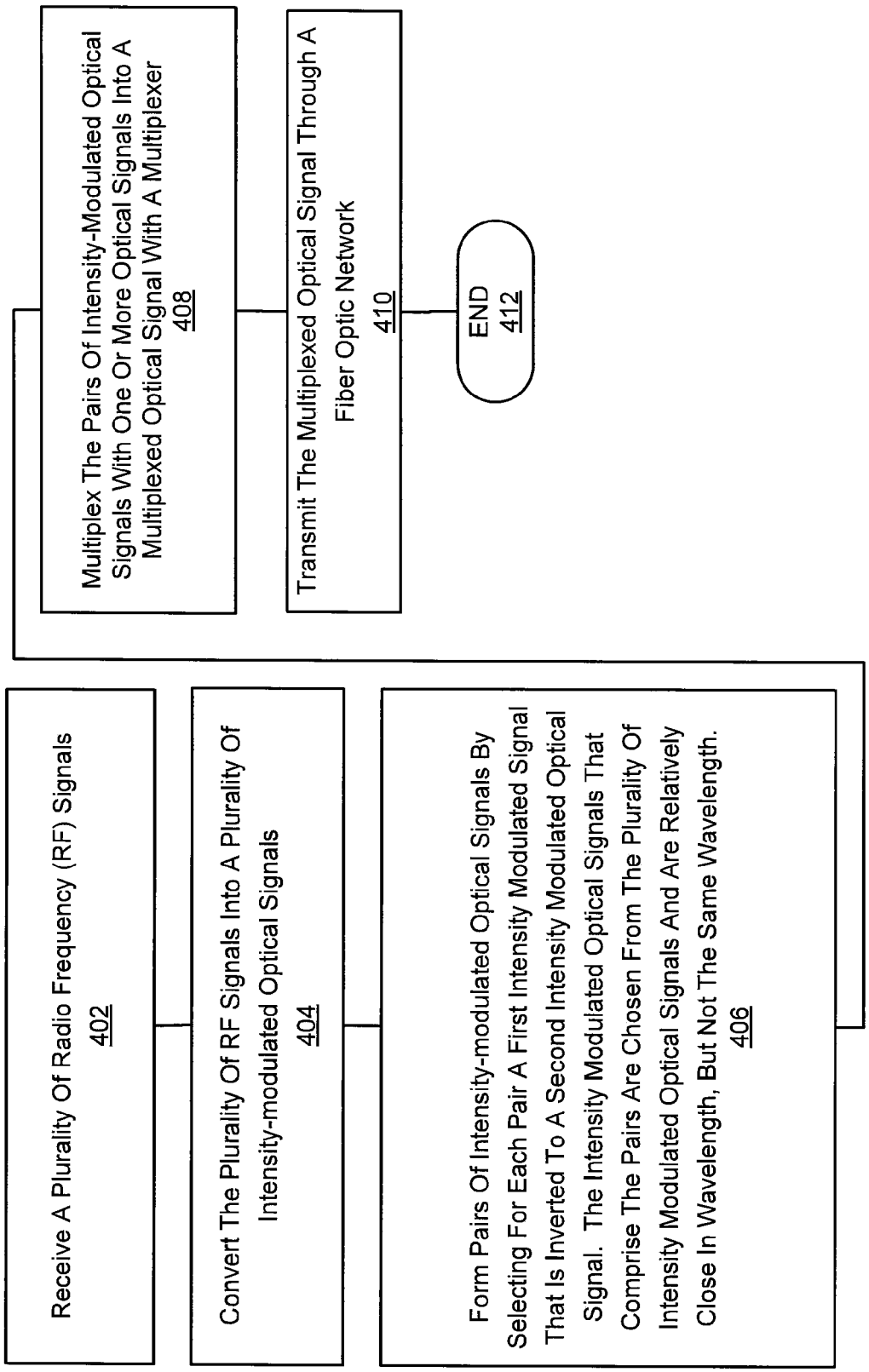
FIG. 5 is a flowchart illustrating an embodiment of a method of reducing Raman and other crosstalk in multiplexed optical signals according to the present invention.

FIG. 5 is a flowchart illustrating an embodiment of a method of reducing Raman crosstalk in multiplexed optical signals according to the present invention. The method comprises the steps of receiving a plurality of RF signals 402. In one aspect, the plurality of RF signals is comprised of a broadcast video signal. At step 404, the plurality of RF signals are converted to intensity-modulated optical signals. Each of the plurality of intensity-modulated optical signals has a different wavelength. At step 406, pairs of intensity-modulated optical signals are formed by selecting for each pair a first intensity-modulated optical signal that is inverted to a second intensity-modulated optical signal. The intensity modulated optical signals that form the pairs are chosen from the plurality of intensity modulated optical signals. The wavelengths of the optical signals that comprise the pairs are relatively close in wavelength, but not of the same wavelength. For example, the wavelengths can be within 2 nm of one another. In another example, the wavelengths can be within 20 nm of one another. In one aspect, the intensity modulated optical signals that form the pairs have a polarization that is substantially the same, though this is not strictly required for crosstalk reduction. At step 408, the pairs of intensity-modulated optical signals are multiplexed with one or more other intensity-modulated optical signals into a combined optical signal; and at step 410 the combined optical signal is transmitted through a fiber optic network. In one aspect, because the optical signals that form the combined optical signal are inverted to one another, Raman crosstalk imposed on any other optical signal that comprises the multiplexed optical signal by any one of the intensity modulated optical signals that form the pairs is reduced because the inversion of the signals one to another cancels or reduces Raman crosstalk imposed on other signals.

The step of receiving a plurality of RF signals can comprise, for example, receiving broadcast video signals, or a combination of broadcast and narrowcast video signals, voice signals, and data signals.

The step of multiplexing the plurality of intensity-modulated optical signals into a multiplexed optical signal with a multiplexer can comprise coarse wavelength-division multiplexing (CWDM), as known to one of ordinary skill in the art, or dense wavelength-division multiplexing (DWDM), also as known to one of ordinary skill in the art. Furthermore, the step of multiplexing the plurality of intensity-modulated optical signals into a multiplexed optical signal with a multiplexer can comprise multiplexing using a polarization-maintaining multiplexer, as are known to one of ordinary skill in the art.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method of reducing crosstalk and associated distortion in multiplexed optical signals comprising:
    receiving a plurality of radio frequency (RF) signals, some of which are broadcast;
    converting the plurality of RF signals into a plurality of intensity-modulated optical signals, wherein each of said plurality of intensity-modulated optical signals has a different wavelength,
    forming one or more pairs of intensity-modulated optical signals by selecting for each pair a first intensity modulated signal that is inverted to a second intensity modulated optical signal, wherein the intensity modulated optical signals that comprise each pair are chosen from the plurality of intensity modulated optical signals and are relatively close in wavelength but not the same;
    multiplexing the one or more pairs of intensity-modulated optical signals into a multiplexed optical signal; and
    transmitting the multiplexed optical signal through a fiber optic network,
        wherein the inverted pairs of intensity modulated optical signals reduce crosstalk and associated distortion imposed on any other optical signal that comprises the multiplexed optical signal by any one of the intensity modulated optical signals that form the pairs.

2. The method of claim 1, wherein the plurality of RF signals are comprised of a combination of broadcast and narrowcast video signals.

3. The method of claim 1, wherein forming the one or more pairs of intensity-modulated optical signals by selecting for each pair a first intensity modulated signal that is inverted to the second intensity modulated optical signal comprises selecting the first intensity modulated signal at a first wavelength and selecting the inverted second intensity modulated optical signal at a second wavelength that is closest to the first wavelength.

4. The method of claim 1, wherein multiplexing the one or more pairs of intensity-modulated optical signals into a multiplexed optical signal comprises dense wavelength-division multiplexing (DWDM) and the intensity modulated optical signals that comprise the pairs are chosen from the plurality of intensity modulated optical signals that are within 2 nm in wavelength from one another.

5. The method of claim 1, wherein multiplexing the one or more pairs of intensity-modulated optical signals into a multiplexed optical signal comprises coarse wavelength-division multiplexing (CWDM) and the intensity modulated optical signals that comprise the pairs are chosen from the plurality of intensity modulated optical signals that are within 20 nm in wavelength from one another.

6. The method of claim 1, wherein multiplexing the one or more pairs of intensity-modulated optical signals into a multiplexed optical signal comprises multiplexing using a polarization-maintaining multiplexer.

7. A system for transporting voice, data and video signals over a fiber optic network with reduced crosstalk comprising:
    one or more inverter devices that receive at least one of a plurality of radio frequency (RF) signals;
    one or more transmitters that convert the plurality of RF signals into a plurality of intensity-modulated optical signals, wherein each of said plurality of intensity-modulated optical signals has a different wavelength; and
    a multiplexer that receives the plurality of intensity-modulated optical signals and multiplexes them into a multiplexed optical signal comprised of one or more pairs of intensity-modulated optical signals having a first intensity modulated signal that is inverted to a second intensity modulated optical signal, wherein the intensity modulated optical signals that comprise each pair are chosen from the plurality of intensity modulated optical signals and are relatively close in wavelength but not the same,
    wherein the inverted pairs of intensity modulated optical signals reduce crosstalk imposed on any other optical signal that comprises the multiplexed optical signal by any one of the intensity modulated optical signals that form the pairs.

8. The system of claim 7, further comprising a demultiplexer, wherein the demultiplexer receives the multiplexed optical signal through a fiber optic network and demultiplexes the multiplexed optical signal into one or more optical signals; and
a receiver, wherein the receiver receives at least one of the one or more optical signals and converts said optical signal into a received electronic signal.

9. The system of claim 7, wherein the radio frequency signals are comprised of broadcast video signals.

10. The system of claim 7, wherein the radio frequency signals are comprised of a combination of broadcast and narrowcast video signals.

11. The system of claim 7, wherein the multiplexer multiplexes the one or more pairs of intensity-modulated optical signals into a multiplexed optical signal comprising dense wavelength-division multiplexing (DWDM) and the intensity modulated optical signals that comprise each pair pairs are chosen from the plurality of intensity modulated optical signals that are within 2 nm in wavelength from one another.

12. The system of claim 7, wherein the multiplexer multiplexes the one or more pairs of intensity-modulated optical signals into a multiplexed optical signal comprises coarse wavelength-division multiplexing (CWDM) and the intensity modulated optical signals that comprise each pair are chosen from the plurality of intensity modulated optical signals that are within 20 nm in wavelength from one another.

13. The system of claim 7, wherein the multiplexer comprises a polarization-maintaining multiplexer.

14. A transmitter for reducing crosstalk in a system for transporting voice, data and video signals over a fiber optic network comprising:

an inverter device that receives an input radio frequency (RF) signal and provides a first output RF signal that is inverted to the input RF signal and a second output RF signal that is not inverted to the input RF signal;
a plurality of electro-optical converters, wherein the plurality of electro-optical converters receive the first output RF signal and the second output RF signal, the plurality of electro-optical couplers being configured to convert the first output RF signal and the second output RF signal into a plurality of optical signals;
one or more modulators, wherein each modulator intensity modulates at least one of the plurality of optical signals; and
a multiplexer that selects a pair of optical signals from the plurality of optical signals based on a wavelength of each of the plurality of optical signals, the pair of optical signals comprising:
a first optical signal; and
a second optical signal that is inverted relative to the first optical signal.

15. The transmitter of claim 14, wherein the transmitter is further comprised of a delay mechanism such that the input RF signal or an optical signal of the pair of optical signals can be adjustably delayed with respect to the input RF signal.

16. The transmitter of claim 14, wherein the input radio frequency signals are comprised of broadcast video signals.

17. The transmitter of claim 14, wherein the input radio frequency signals are comprised of a combination of broadcast and narrowcast video signals.

18. The transmitter of claim 14, wherein the plurality pair of optical signals are directly modulated.

19. The transmitter of claim 14, wherein the plurality of optical signals are externally modulated.

20. The transmitter of claim 14, wherein the inverter device is an electronic amplifier.

* * * * *